US005078762A

United States Patent [19]

Hung

[11] Patent Number: 5,078,762

[45] Date of Patent: Jan. 7, 1992

[54] FILTER STRUCTURE FOR AN AIR-SPRAY GUN

[76] Inventor: Chun-I Hung, No. 8, Lane 75, Hsin-Yi Rd., Lu-Chou Hsiang, Taipei Hsien, Taiwan R.O.C., Taiwan

[21] Appl. No.: 487,868

[22] Filed: Mar. 5, 1990

[51] Int. Cl.[5] .......... B01D 45/00

[52] U.S. Cl. .......... 55/218; 55/337; 239/DIG. 14

[58] Field of Search .......... 55/218, 337; 239/DIG. 14

[56] References Cited

U.S. PATENT DOCUMENTS

| | | | |
|---|---|---|---|
| 1,427,674 | 8/1922 | Blaney | 55/337 |
| 3,269,097 | 8/1966 | German | 55/337 |
| 3,318,323 | 5/1967 | Pearson | 55/337 |
| 3,378,993 | 4/1968 | Veres et al. | 55/337 |
| 3,418,789 | 12/1968 | Hoffman et al. | 55/337 |
| 3,507,098 | 4/1970 | Veres et al. | 55/337 |
| 3,650,479 | 3/1972 | Liedberg | 239/DIG. 14 |
| 3,845,840 | 11/1974 | Thrasher | 55/337 |
| 3,901,670 | 8/1975 | Minami | 55/337 |
| 4,361,425 | 11/1982 | Hata | 55/337 |
| 4,409,005 | 10/1983 | McKendrick | 55/337 |

FOREIGN PATENT DOCUMENTS

| | | | |
|---|---|---|---|
| 217439 | 3/1961 | Austria | 55/337 |
| 287913 | 6/1967 | Austria | 55/337 |
| 2263020 | 10/1975 | France | 55/337 |

*Primary Examiner*—Jay H. Woo
*Assistant Examiner*—C. Scott Bushey

[57] ABSTRACT

It is filter structure for an air-spray gun, which includes a cylinder portion mounted between a push-button switch and the intake port of the air-spray gun. The cylinder portion includes a centrifugai filter, of which the upper end is mounted with a micro-filter chamber closely connected with the inlet of the push-button switch. The lower end of the centrifugal filter is mounted with a filtering cylinder and a water-guide plate. The moisture will be separated from the pressurized air when the pressurized air flows through the centrifugal filter. The moisture separated will flow into a water chamber, and will be drained off through a water-exhausting valve. After the pressurized air passes through the filtering cylinder, impurities in the air will be filtered out of the air, and then the air flows through a micro-filter chamber to separate any moisture from the air so as to let the pressurized air sprayed out of the gun contain no impurities and moisture at all.

2 Claims, 2 Drawing Sheets

FILTER STRUCTURE FOR AN AIR-SPRAY GUN

BACKGROUND OF THE INVENTION

1. Field of the Invention

This invention relates to an air-spray gun; particularly, it relates to a filter structure of an air-spray gun for separating the moisture and impurities from the air sprayed out of the gun.

2. Description of the Prior Arts

In the conventional paint-spray gun, the handle of the gun has a tube directly connected with an air compressor to supply pressurized air. The tube is used as a Venturi tube so as to have a paint sprayed to an object.

When the air is compressed in a conventional air compressor, moisture is usually contained in the pressurized air and is to be mixed up with the paint coated on an object such as a furniture. Since the moisture and the paint are unable to become a compound, the moisture is usually coated on the surface of an object, and the moisture is covered by the paint sprayed; as a result, the surface sprayed with paint would have moisture spots. The moisture spot often annoys the paint sprayer.

Another conventional air compressor has a filter mounted nearing the outlet of the air compressor for filtering and separating moisture in the air. Such a filter can only be useful when the air compressor is replaced, or the air compressor is a new one. The aforesaid drawback of a conventional air compressor is still not overcome.

In another conventional air spray gun, a moisture filter is mounted between the compressor and the spray gun for separating moisture and impurities from the air: however, the moisture filter function would fail after using a period of time, and only the impurities filtering function is workable.

Still another conventional air spray gun has a filter which can separate impurities and moisture from the air sprayed; unfortunately, the dimensions of the filter are rather large, and therefore it can only be installed in a large air spray equipment or at the outlet of an air compressor. It is unable to be mounted in all the air spray gun or the like.

SUMMARY OF THE INVENTION

This invention relates to a filter structure for an air-spray gun, which mainly comprises a centrifugal filter assembly to be mounted in the cylinder portion of the air-spray gun. The filter assembly can separate moisture from the air, and can drain off the water changed from moisture out of a water-exhausting valve; simultaneously, it can separate impurities from the air by means of a filtering cylinder. Any moisture remained in the air will finally be separated from the air so as to maintain the air sprayed out having no any moisture at all.

The primary object of the present invention is to provide a filter structure for separating moisture and impurities from the pressurized air completely.

Another object of the present invention is to provide a filter structure, which may be installed in an air-spray gun or a paint-spray gun so as to separate impurities from the air or the paint to be sprayed.

Still another object of the present invention is to provide a filter structure, in which the centrifugal filter assembly has a plurality of slanting fins to let the pressurized air inside the spray gun produce a whirlpool-shaped air stream to force the moisture to be separated from the air; then, the pressurized air sprayed out of the gun would contain no moisture at all.

A further object of the present invention is to provide a filter structure, in which a micro-filter chamber is mounted between the centrifugal filter assembly and the inlet of the push-button switch. The micro-filter chamber can finally separate any moisture and impurities left in the pressurized air completely.

A still further object of the present invention is to provide a filter structure, in which a filtering cylinder is mounted under the centrifugal filter assembly for separating impurities from the pressurized air.

A still further object of the present invention is to provide a filter structure, in which a water-guide plate is mounted under the filtering cylinder so as to guide the water separated from the air to flow into a water chamber; the water in the water chamber can be drained off through a water-exhausting valve.

A yet further object of the present invention is to provide a filter structure, in which the water-exhausting valve under the water chamber is maintained in closed condition by means of a spring. When the air-spray gun is in operation condition, the pressurized air will cause the valve member and the O-shaped ring to be in close contact with each other. When no pressurized air is applied to the gun, the water in the water chamber can be drained off automatically. During operation, the water in the water chamber can also be drained off by simply pushing the external end of the valve member.

Another further object of the present invention is to provide a filter structure, which may be installed in a paint-spray gun or an air-spray gun. The filter structure may also be installed to a single cylinder for separating moisture and impurities from a pressurized air.

DETAILED DESCRIPTION

Figure 1:
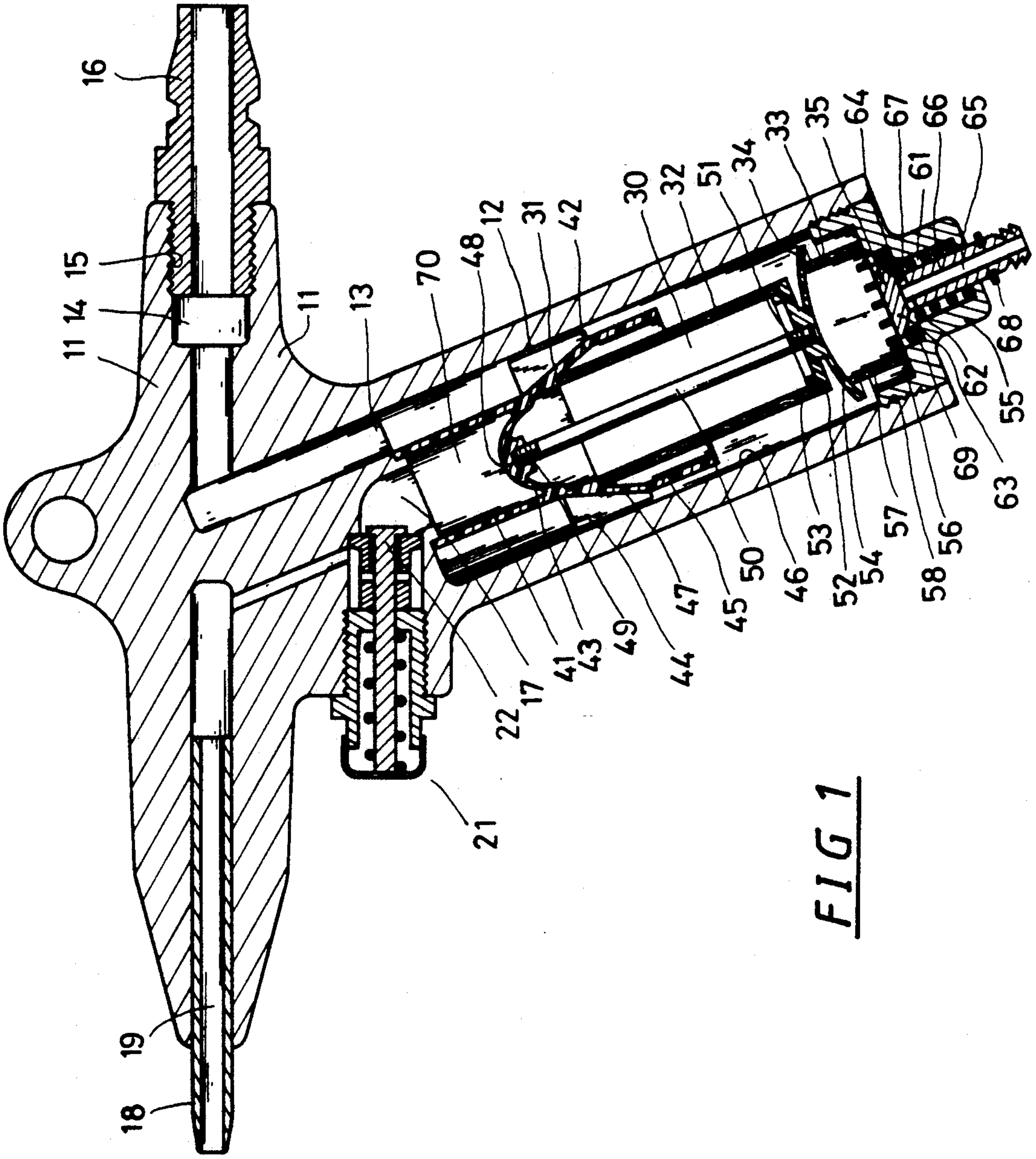
FIG. 1 is a sectional view of an embodiment according to the present invention.
Figure 2:
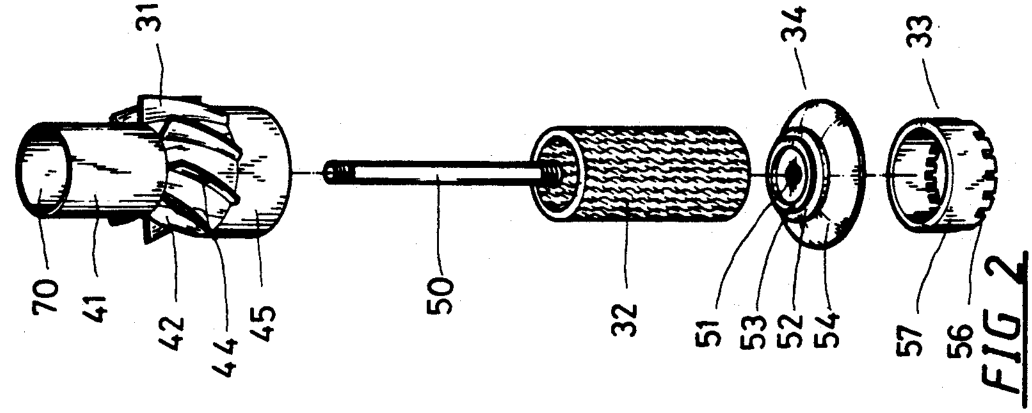
FIG. 2 is a disassembled view of the major parts of the present invention.
Figure 3:
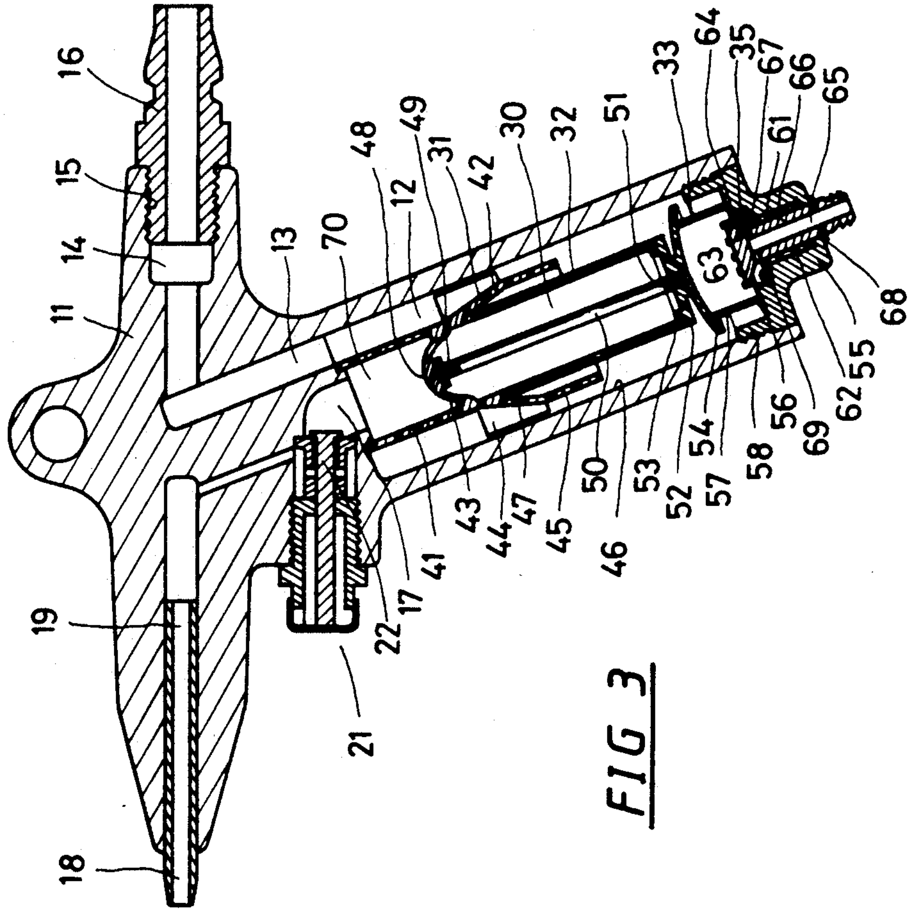
FIG. 3 is a sectional view of the filter structure of the air-spray gun according to the present invention, showing the structure of the water exhausting valve.

Referring to FIGS. 1 to 3, the embodiment of the present invention mainly comprises a body portion 11 with a cylinder portion 12; the cylinder portion 12 has an intake passage 13, of which the intake part 14 has threads 15 for connecting with a pressure-air tube via a snap connector 16.

Inside the cylinder portion 12, there is a filter unit 30, where the moisture and impurities in the pressurized air may be separated, and the pressurized air will be directed into a tube passage 17. A push-button switch 21 is mounted between the tube passage 17 and the external passage 19 of a supply pipe 18. The whole operation of the air-spray gun is controlled by a valve 22 of the push-button switch 21 so as to control the flow rate of the pressurized air.

As shown in FIGS. 1 to 3, the filter unit 30 in the cylinder portion 12 mainly includes a centrifugal filter assembly 31, a filtering cylinder 32, a water chamber 33, a water-guide plate 34, and water-exhausting valve 35. The upper end of the centrifugal filter assembly 31 is formed into a straight cylinder 41, which is in close and air-tight connection with the tube passage 17 so as to provide a passage for the pressurized air not flowing directly from the intake passage 13 to the tube passage 17.

The centrifugal filter assembly 31 has a straight cylinder 41 on the upper end thereof, a cone-shaped cylinder 42 in the middle portion thereof, several round holes 43 therein, a plurality of slanting fins 44 being furnished on the outside of the cone-shaped cylinder 42, and a lower cylinder 45 at the lower end thereof. When the pressurized air enters the cylinder 12 via the intake passage 13, the pressurized air will be changed into a whirlpool-shaped air stream as a result of the straight cylinder 41, the slanting fins 44, the cone-shaped cylinder 42, and the lower cylinder 45 in the centrifugal filter assembly 31. The whirlpool air stream would force the moisture in the pressurized air to be separated and to attach to the inner wall 46 of the cylinder portion 12; in other words, the moisture in the pressurized air is filtered out of the air stream as a result of the centrifugal force.

The filtering cylinder 32 is movably mounted in the cone-shaped cylinder 42 for filtering the impurities out of the air; in the inner surface of the cone-shaped cylinder 42, there is a shoulder portion 47, on which the filtering cylinder 32 rests. The filtering cylinder 32 is fixedly mounted in place by means of a screw bolt 50, of which the upper end is mounted in a screw hole 49 furnished in the top portion 48 of the cone-shaped cylinder 42; the lower end of the bolt 50 is fixed to the water-guide plate 34.

The filtering cylinder 32 is a cylindrical member made of sintered material. When the pressurized air flows through the centrifugal filter assembly, the impurities in the air will be absorbed and filtered by the sintered material.

The lower end of the filtering cylinder 32 is movably connected with the water-guide plate 34, which is connected with the screw bolt 50 by means of a screw hole 51; further, the water-guide plate 34 includes an upper end part 52 with a round flange 53, which is used for fixedly mounting the filtering cylinder 32 between the centrifugal filter assembly 31 and the water-guide plate 34 so as to guide the pressurized air to flow through the filtering cylinder 32, the centrifugal filter assembly 31, the straight cylinder 41, and the pushbutton switch 21.

The upper end part 52 of the water-guide plate 34 is used to mount the filtering cylinder 32; the lower end part 54 of the water-guide plate 34 is formed into a convex-shaped disk to be mounted over the water chamber 33, which is connected with a plug 55. The lower end part 54 formed into a convex-shaped disk provides a cover for the water chamber 33 so as to facilitate the moisture separated from the air to attach on the convex surface, and then the condensed water drops will flow into the water chamber 33.

The water chamber 33 includes a cylindrical part 57 connected to the water-guide plate 34, and a plurality of apertures 56 formed at one end thereof. The plug 55 is mounted into the threaded hole 58 of the inner wall 46 to provide a fastening force to have the water chamber 33, the water-guide palte 34, the centrifugal filter assembly 31 and the tube passage 17 assembled together tightly. The water chamber 33 is used for collecting the water separated from the air; the water collected in the chamber 33 may be drained through a water-exhausting valve 35 mounted on the plug 55.

The center of the water-exhausting valve 35 has a passage hole 61 with a spring 62, and a valve member 63. The valve member 63 is formed into a reverse cone shape, and the bevel face 64 of the valve member 63 can be in water-tight contact with an O-shaped ring on the upper end of the passage hole upon the valve being in closed condition. The valve member 63 has a valve stem 66 with a water hole 65, which is in communication with through holes 67 under the bevel face 64. When the valve member 63 is opened, the water in the water chamber will be drained off via the through holes 67. The valve member 63 can maintain a suitable elastic condition by means of the spring 62. The outer end of the valve stem 66 is mounted with a C-shaped retaining ring 68 rested in annular groove on the stem 66.

The present invention can be operated by pressing the push-button switch 21 to have the pressurized air passed through the intake passage 13 and the cylinder portion 12; the moisture in the pressurized air will be separated from the air by means of the centrifugal filter assembly 31, and then be collected on the inner wall 46 to flow into the water chamber 33; at the same time, the water-exhausting valve 35 is in a closed condition as a result of the effect of the pressurized air. After the air flows into the filtering cylinder 32, the impurities in the pressurized air will be separated; after the pressurized air flows through the round holes 43 in the centrifugal filter assembly, the tiny moisture particles will be separated by a micro-filter chamber 70 on the upper end of the straight cylinder 41; then, the pressurized air will flow through the tube passage 17, the push-button switch 21, the external passage 19 and the supply pipe 18 to perform a given work. The pressurized air flowing out of the supply pipe 18 contains no moisture and impurities at all.

The water gathered in the water chamber 33 is to be drained by pressing the valve stem 66 so as to provide a gap between the valve member 63 and the seal ring 69; in that case, the water can be drained off through the water hole 65. The water gathered in the water chamber 33 can also be drained off after the output of the pressurized air is discontinued and after the valve member 63 is sprung to open condition automatically by spring 62 so as to prevent the water chamber from gathering too much water.

Since the present invention can completely separate the moisture and impurities in a pressurized air by means of the special filtering structure and the water-exhausting structure, it is deemed a practical and novel disclosure.

I claim:

1. A filter structure in an air-spray gun comprising a filter unit mounted between an air passage and a push-button switch, air from said air passage flows through said filter unit and said push-button switch and flows out of said air-spray gun, said push-button switch being disposed in said air-spray gun for adjusting a flow rate of said air, said filter unit including:

a centrifugal filter assembly having a straight cylinder formed in an upper end thereof and in close connection with a tube passage, a cone-shaped centrifugal filter assembly formed on a middle part thereof and a lower cylinder formed on a lower part thereof, a micro-filter chamber being formed in said straight cylinder, a plurality of slanting fins being distributed around said cone-shaped cylinder;

a water-guide plate having a convex-shaped disc formed on a lower end portion thereof;

a filtering cylinder coupled between said centrifugal filter assembly and said water-guide plate by a bolt;

a water chamber enclosed by a round flange, an upper end thereof being connected with said convex-shaped disc of said water-guide plate, a plurality of apertures which are equally distributed being formed in a lower portion of said round flange enclosing said water chamber; and a plug forming a lower wall portion of said water chamber, said plug having a water-exhausting valve, a valve stem being resiliently mounted in said water-exhausting valve and having a lower end extending outside of said water-exhausting valve whereby said lower end of said valve stem is pushed in order to discharge water contained within said water chamber.

2. A filter structure as claimed in claim 1, wherein a passage hole is formed in said plug for receiving a spring and a valve member, a lower surface of said valve member is cone shaped and rests on said spring and said valve stem, a water hole is formed in said valve stem, a plurality of through holes are formed in an upper end portion of said valve stem and are communicated with said water hole, whereby water flows through said through holes and said water hole and flows out of said air-spray gun when said valve member is biased upward by said spring.

* * * * *